US010113431B2

(12) United States Patent
Namgoong

(10) Patent No.: US 10,113,431 B2
(45) Date of Patent: Oct. 30, 2018

(54) FLUIDFOIL

(71) Applicant: ROLLS-ROYCE PLC, London (GB)

(72) Inventor: Howoong Namgoong, Derby (GB)

(73) Assignee: ROLLS-ROYCE plc, London (GB)

( * ) Notice: Subject to any disclaimer, the term of this patent is extended or adjusted under 35 U.S.C. 154(b) by 725 days.

(21) Appl. No.: 14/104,607

(22) Filed: Dec. 12, 2013

(65) Prior Publication Data

US 2014/0212287 A1    Jul. 31, 2014

(30) Foreign Application Priority Data

Jan. 25, 2013  (GB) .................... 1301329.7

(51) Int. Cl.
*F01D 5/14* (2006.01)
*B64C 11/18* (2006.01)
*B64D 27/00* (2006.01)

(52) U.S. Cl.
CPC .............. *F01D 5/145* (2013.01); *B64C 11/18* (2013.01); *B64D 2027/005* (2013.01); *Y02T 50/66* (2013.01)

(58) Field of Classification Search
CPC .......... F01D 5/145; F01D 5/148; F01D 5/141; B64C 11/18; B64C 27/467; B64D 2027/005; F05D 2240/303; F05D 2240/305; F05D 2240/301
See application file for complete search history.

(56) References Cited

U.S. PATENT DOCUMENTS

| 1,366,635 | A | 1/1921 | Conway |
| 2,800,291 | A | 7/1957 | Stephens |
| 4,863,117 | A | 9/1989 | Riout |
| 4,886,421 | A | 12/1989 | Danson |
| 8,221,081 | B2 * | 7/2012 | Lebrun .................... B64C 11/18 416/129 |
| 9,249,666 | B2 * | 2/2016 | Wood .................... F04D 29/324 |
| 2010/0329879 | A1 | 12/2010 | Presz, Jr. et al. |
| 2012/0061522 | A1 | 3/2012 | Sullivan et al. |
| 2013/0224031 | A1 * | 8/2013 | Breeze-Stringfellow ..................... B64C 11/18 416/223 R |
| 2013/0224037 | A1 * | 8/2013 | Simpson ................. F01D 5/145 416/235 |

FOREIGN PATENT DOCUMENTS

| DE | 9013099 U1 | 11/1991 |
| EP | 0 274 777 A1 | 12/1987 |
| EP | 2 270 312 A1 | 5/2011 |

(Continued)

OTHER PUBLICATIONS

May 2, 2013 Search Report issued in British Patent Application No. GB 1301329.7.

(Continued)

*Primary Examiner* — David E Sosnowski
*Assistant Examiner* — Juan G Flores
(74) *Attorney, Agent, or Firm* — Oliff PLC

(57) ABSTRACT

A fluidfoil is disclosed including a leading edge and a leading edge zone behind the leading edge. The leading edge zone extends spanwise for the full length of the fluidfoil. The leading edge zone includes one or more deflected regions which locally reduce the angle of attack of the fluidfoil.

15 Claims, 3 Drawing Sheets

(56) References Cited

FOREIGN PATENT DOCUMENTS

WO      WO 92/05341      4/1992

OTHER PUBLICATIONS

Nov. 30, 2017 Extended European Search Report issued in European Patent Application No. 13196929.7.
Hradecky, Simon. "Accident: Delta B764 at Rome on Jul. 7, 2007, multiple bird strikes in both engines, gear, slats and windows during takeoff". http://avherald.com/h?article=3f6e19a9 Jul. 10, 2007.

* cited by examiner

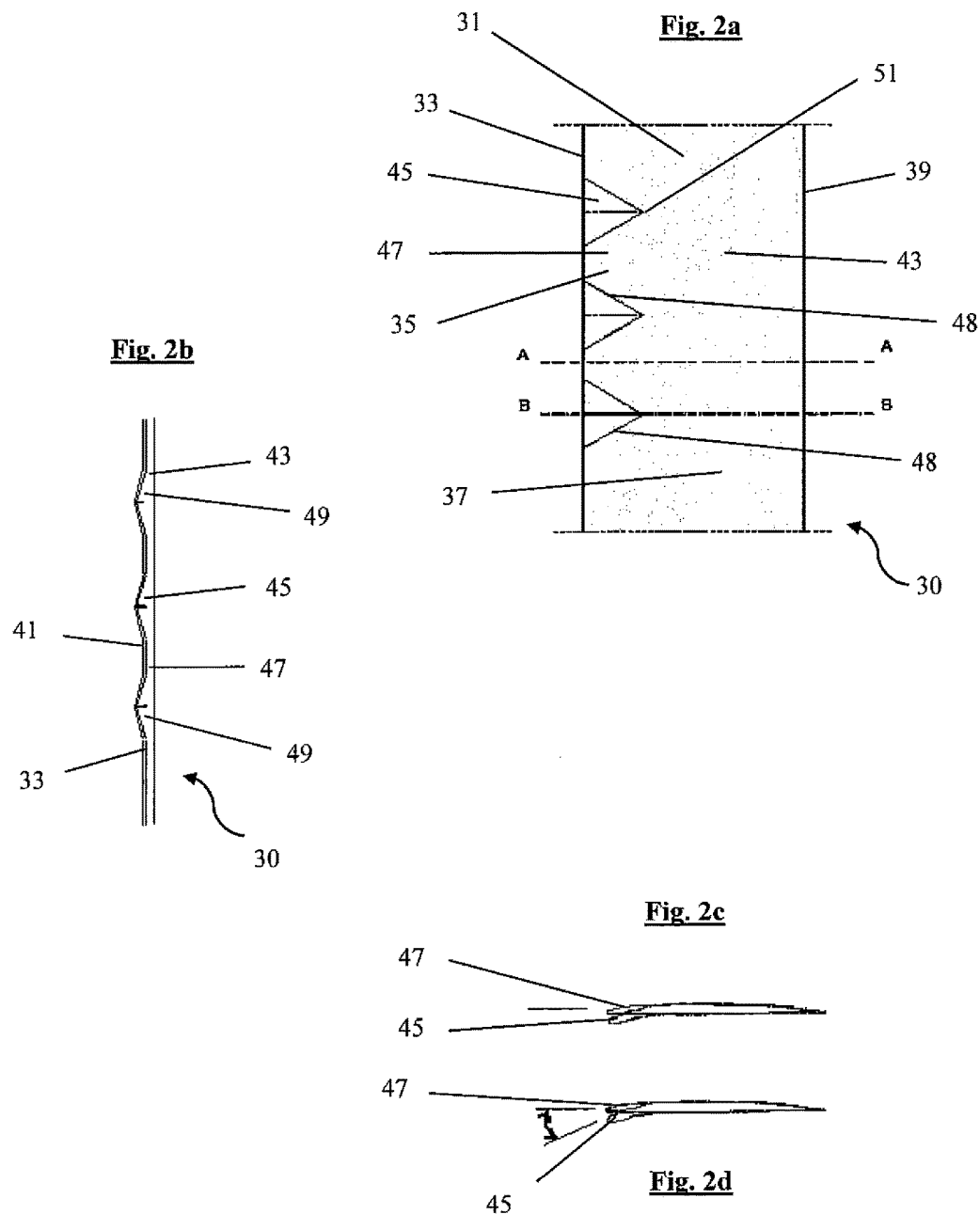

FLUIDFOIL

The present invention relates to fluidfoils and engines incorporating fluidfoils. The invention may be particularly useful when used with open-rotor gas turbine engines. For convenience the background section below references open-rotor configurations by way of example. The invention is not however limited to such uses and may be used in other applications, particularly those where the fluidfoil may have a relatively high angle of attack and where it is desirable to reduce noise and/or vortices leaving the fluidfoil.

Certain open-rotor configurations utilise rotors designed to attain and maintain a fixed rate of rotation. In such cases the thrust provided by the rotor is controlled by varying the pitch of the blades (a higher angle of attack for increased thrust and a lower angle of attack decreased thrust). At higher angles of attack air separation at greater distances from the leading edge is more likely to occur. This is the result of a greater adverse pressure gradient encountered by air flowing towards the leading edge. Once the oncoming flow has insufficient momentum to overcome the pressure gradient it will separate. With greater separation distances from the leading edge, the wake produced by the blade is increased (increasing noise) and greater aerodynamic loss occurs (reducing efficiency). These characteristics may be particularly undesirable at take-off when high thrust (and therefore increased angle of attack) is required.

According to a first aspect of the invention there is provided a fluidfoil optionally comprising a leading edge and optionally a leading edge zone behind the leading edge optionally extending spanwise over the full span of the fluidfoil, where the leading edge zone optionally comprises one or more deflected regions which optionally locally reduce the angle of attack of the fluidfoil.

When the fluidfoil is in use, an area of the leading edge having a reduced angle of attack may increase the momentum of fluid approaching that area. In this way the distance from the leading edge at which flow separation occurs may be reduced. The increased momentum in the region of the deflected region may also entrain nearby flows, thereby reducing flow separation in regions of the leading edge zone that are conventional/non-deflected. By reducing the flow separation distance in advance of the leading edge, the wake caused by the fluidfoil may be reduced and so also the broadband noise produced. Further the decreased flow separation distance may also reduce overall lift loss and drag, improving efficiency. It may be for example that a slower fluidfoil speed than would otherwise be required would be sufficient to produce a given force. This may also have the additional benefit of further reducing noise.

It is further noted that the deflected region may have a similar effect to an aerodynamic fence, blocking spanwise flow migration, thus reducing fluidfoil tip vortices.

Throughout the remainder of this document optional features of the, some or each deflected region are for simplicity (except where otherwise specified) indicated via discussion of a single deflected region. As will be appreciated however, features discussed in relation to a single deflected region may also be applied to additional or indeed all deflected regions.

In some embodiments the deflected region comprises a local modification to the surface contouring of the leading edge zone. It may therefore be possible to achieve the desired effect without attaching additional flow modifying components to the fluidfoil.

In some embodiments the deflected region comprises a portion of the leading edge zone angled further towards the pressure surface of the fluidfoil than non-deflected regions of the leading edge zone which extend spanwise to either side and/or between each deflected region. In this way the deflected region may define a scoop with an associated leading edge defining a reduced angle of attack when compared to surrounding areas of the leading edge zone.

In some embodiments the fluidfoil has a consistent angle of attack in the non-deflected regions. The combination of deflected and non-deflected regions may produce a preferred compromise between different performance envelopes of the fluidfoil. The non-deflected regions may be optimised in the normal way (e.g. efficient force production for important areas of the performance envelope), while the deflected regions assist in managing fluid flow at the leading edge and performance in particular operating regimes.

In some embodiments there is no local chordwise extension of the leading edge associated with the deflected region. Likewise there may be no local chordwise retraction of the leading edge associated with the deflected region. Additionally or alternatively it may be that there is no local extension and/or retraction of the camber line associated with the deflected region. It may be for example that the curve of the leading edge along the span of the fluidfoil is maintained as it passes deflected and non-deflected regions of the leading edge zone. Additionally or alternatively it may be that a curve in the leading edge along the span of the fluidfoil remains positive in gradient rather than alternating between positive and negative.

In some embodiments the extent of the deflected region decreases from the leading edge through the leading edge zone. This may create a blend (which may be gradual) into a main body of the fluidfoil which extends behind the leading edge zone. In this way the deflected region may have the desired effect on fluid impinging on the leading edge without unduly impacting on the flow of fluid over the remainder of the fluidfoil main body.

In some embodiments the deflected region blends into a main body of the fluidfoil extending behind the leading edge zone and disappears. It may be advantageous for the deflected region to blend completely rather than continue into and/or through the main body.

In some embodiments the depth of the deflected region tapers in one or both spanwise directions so as to blend with the respective non-deflected region of the leading edge zone. The deflected region may have a cross-section of substantially triangular form. The spanwise taper may be straight edged (with one consistent gradient or more than one gradient) or curved (convex, concave or a combination) or a combination of any of the above. A region of curved gradient may be particularly advantageous where the deflected and non-deflected regions meet.

In some embodiments the depth of the deflected region tapers in a chordwise direction from a maximum at the leading edge so as to blend with the main body of the fluidfoil. In this way the deflected region may define an upwardly orientated ramp for fluid passing the leading edge on the suction side of the fluidfoil in the area of the deflected region. The chordwise taper may be straight edged (with one consistent gradient or more than one gradient) or curved (convex, concave or a combination) or a combination of any of the above.

In some embodiments the spanwise width of the deflected region decreases in a chordwise direction from a maximum at the leading edge, through the leading edge zone, to no spanwise width at the interface of the leading edge zone with the main body.

In some embodiments at least one deflected region is provided nearer to a tip than a root of the fluidfoil. In some embodiments at least one deflected region is provided beyond 80% and/or 90% of the distance from the root to the tip of the fluidfoil. In some embodiments the number of deflected regions increases from the root to the tip of the fluidfoil. Flow separation may be more likely to occur towards the tip of the fluidfoil.

In some embodiments a pattern of deflected and non-deflected regions is provided spanwise along the leading edge zone. In some embodiments the pattern comprises alternating deflected and non-deflected regions.

In some embodiments the fluidfoil is an open-rotor blade. The present invention may be particularly relevant to open-rotor. Open-rotor may be more susceptible to flow separation due to the thinness of the blades. Further noise may be a particular issue, potentially exacerbated by front rotor tip vortex and/or wake ingestion by the rear of a pair of contra-rotating rotors. The invention may also help to mitigate installation effect (where the incoming flow direction is not parallel to the rotation axis), especially in open-rotor blades. As will be appreciated however the invention is not limited to use with open-rotor blades. In other embodiments the fluidfoil may be a fan blade, compressor blade, turbine blade, propeller blade, wind turbine blade or ship propeller.

According to a second aspect of the invention there is provided a gas turbine engine provided with one or more fluidfoils in accordance with the first aspect of the invention.

In some embodiments the gas turbine engine utilises an open rotor configuration with at least one open rotor blade corresponding to the fluidfoil of the first aspect.

In some embodiments the open rotor configuration comprises a contra-rotating pair of rotors, with at least one open rotor blade of the front-most rotor corresponding to the fluidfoil of the first aspect. As will be appreciated at least one open rotor blade of the rear-most rotor may alternatively or additionally correspond to the fluidfoil of the first aspect.

The skilled person will appreciate that a feature described in relation to any one of the above aspects of the invention may be applied mutatis mutandis to any other aspect of the invention.

BRIEF DESCRIPTION OF DRAWINGS

Embodiments of the invention will now be described by way of example only, with reference to the figures, in which:

FIG. 2a is a top view of a portion of fluidfoil according to an embodiment of the invention;

FIG. 2b is a front view of the portion shown in FIG. 2a;

FIG. 2c shows section A-A in accordance with FIG. 2a;

FIG. 2d shows section B-B in accordance with FIG. 2a;

Referring to FIG. 1, a twin-spooled, contra-rotating propeller gas turbine engine is generally indicated at 10 and has a principal rotational axis 9. The engine 10 comprises a core engine 11 having, in axial flow series, an air intake 12, an intermediate pressure compressor 14, a high-pressure compressor 15, combustion equipment 16, a high-pressure turbine 17, an intermediate pressure turbine 18, a free power (or low-pressure) turbine 19 and a core exhaust nozzle 20. A nacelle 21 generally surrounds the core engine 11 and defines the intake 12 and nozzle 20 and a core exhaust duct 22. The engine 10 also comprises two contra-rotating propeller stages 23, 24 attached to and driven by the free power turbine 19 via shaft 26.

Figure 1:
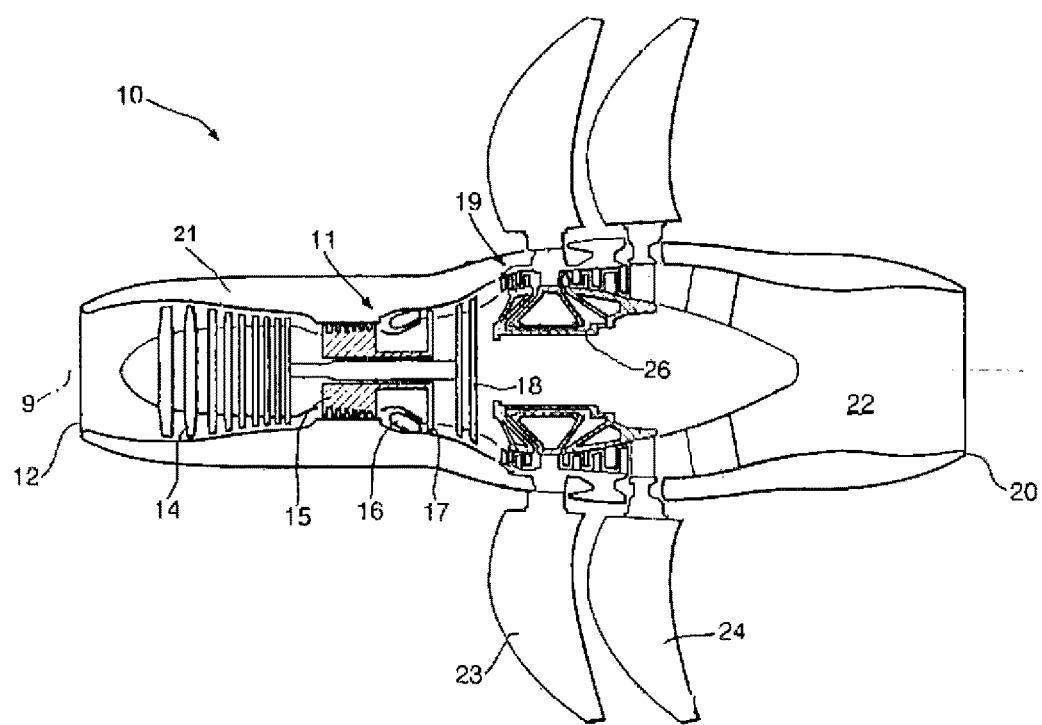
FIG. 1 is a sectional side view of a gas turbine engine having contra-rotating propeller stages.

The gas turbine engine 10 works in a conventional manner so that air entering the intake 12 is accelerated and compressed by the intermediate pressure compressor 14 and directed into the high-pressure compressor 15 where further compression takes place. The compressed air exhausted from the high-pressure compressor 15 is directed into the combustion equipment 16 where it is mixed with fuel and the mixture combusted. The resultant hot combustion products then expand through, and thereby drive the high-pressure, intermediate pressure and free power turbines 17, 18, 19 before being exhausted through the nozzle 20 to provide some propulsive thrust. The high-pressure, intermediate pressure and free power turbines 17, 18, 19 respectively drive the high and intermediate pressure compressors 15, 14 and the propellers 23, 24 by suitable interconnecting shafts. The propellers 23, 24 normally provide the majority of the propulsive thrust. In the embodiments herein described the propellers 23, 24 rotate in opposite senses so that one rotates clockwise and the other anti-clockwise around the engine's rotational axis 9.

Referring now to FIGS. 2a and 2b a portion of a fluidfoil is generally shown at 30. The fluidfoil 31 has a leading edge 33, a leading edge zone 35 immediately behind the leading edge 33, a main body 37 immediately behind that and a trailing edge 39. The leading edge zone 35 is positioned behind the leading edge 33 (along the camber line) and extends spanwise for the full length of the fluidfoil. The leading edge zone 35 may therefore be considered to comprise a spanwise band behind the leading edge 33. The fluidfoil has a pressure surface 41 and a suction surface 43.

Within the leading edge zone 35 are deflected regions 45 and non-deflected regions 47. The deflected 45 and non-deflected regions 47 form an alternating repeating pattern in the spanwise direction. The leading edge zone 35 encompasses the full depth of the fluidfoil 31, from and including the pressure surface 41 to and including the suction surface 43, for the full extent of the leading edge zone 35.

The non-deflected regions 47 contribute to the formation of a standard fluidfoil cross-sectional profile defined by the leading edge 33, non-deflected region 47, main body 37 and trailing edge 39. This profile (A-A in FIG. 2a) is shown in FIG. 2c (with a cross-section at the deflected region 35 corresponding to line B-B in FIG. 2a shown in phantom). In the non-deflected regions 37 the angle of attack is consistent (the same).

Where however deflected regions 45 are provided, the standard fluidfoil cross-section is modified by a change in the contours of the pressure 41 and suction 43 surfaces. The deflected region 45 reduces the angle of attack of the fluidfoil 31 locally (local to the deflected region 45 in contrast to the higher angle of attack in the non-deflected regions 47). This is achieved via angling the deflected region 45 of the leading edge zone 35 further towards the pressure surface 41 of the fluidfoil 31 than non-deflected regions 47 of the leading edge zone 35. This angling can be seen in FIG. 1d corresponding to the cross-section through the fluidfoil 31 along line B-B in FIG. 2a (also shown in phantom is the cross-section along the line A-A). This angling gives the deflected region 45 a depth and consequently the leading edge 33 in the area of the deflected region 45 is below the line created by the leading edge 33 in the area of the non-deflected regions 47. The leading edge 33 is therefore deflected with the leading edge zone 35 in the deflected region 45, it being angled towards the pressure surface 41. It should be noted however that there is no local chordwise extension of the fluidfoil 31 in the area of the deflected region 45. Instead the line of the leading edge 33 is maintained throughout its vertical deflection.

Each deflected region 45 is also provided with several tapering features. The depth of the deflected region 45 (i.e. the vertical distance between the suction surface 43 within a deflected region 45 and the suction surface 43 at a deflection interface 48 between a deflected region 45 and a non-deflected region 47) tapers in both spanwise directions so as to blend with the respective non-deflected region 47 to either side. Consequently the deflected region forms a valley having a substantially triangular cross-sectional shape. The spanwise tapers form two side walls 49, each having a consistent gradient. The depth of each deflected region 45 also tapers in a chordwise direction from a maximum at the leading edge 33 so as to blend with the main body 37 of the fluidfoil 31. This gives the deflected regions 45 an upwards ramp. Further the spanwise width of each deflected region 45 (i.e. the distance between deflection interfaces 48 at either side of the deflected region 45) decreases in a chordwise direction from a maximum at the leading edge 33, through the leading edge zone 35 and disappears at a main body interface 51 of the leading edge zone 35 with the main body 37.

As a consequence of the various tapering features the extent of the deflected region 45 may be said to decrease from the leading edge 33 through the leading edge zone 35, such that it blends into the main body 37 and disappears.

Figure 3A:
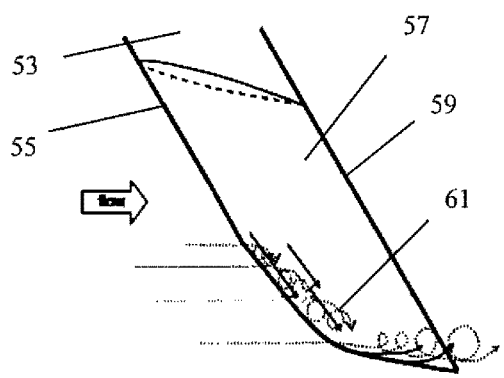
FIG. 3a shows a conventional fluidfoil not incorporating the present invention.
Figure 3B:
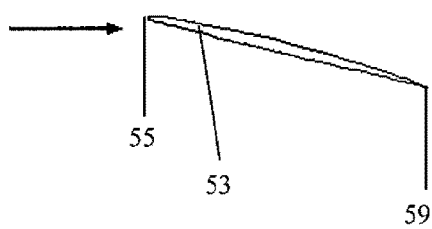
FIG. 3b shows the angle of attack of the FIG. 3a fluidfoil.

With reference to FIGS. 3a and 3b, features of the flow of fluid around a fluidfoil 53 without deflected regions is explained. In use fluid approaches a leading edge 55 of the fluidfoil, passes the leading edge 55 and travels over or under a main body 57 of the fluidfoil 53 before passing a trailing edge 59. The leading edge 55 creates an adverse pressure gradient encountered by the fluid flowing towards it. This pressure gradient is stronger when the fluidfoil 53 is at higher angles of attack. The fluid flow approaching the leading edge 55 will separate at the point where its momentum is insufficient to overcome the adverse pressure gradient. The further the fluid flow is from the leading edge 55 at separation, the greater the size of the vortices 61 that will be produced by the fluidfoil 53.

Figure 4A:
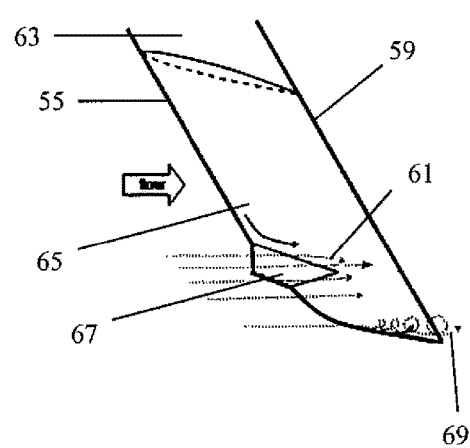
FIG. 4a shows a fluidfoil in accordance with an embodiment of the invention.
Figure 4B:
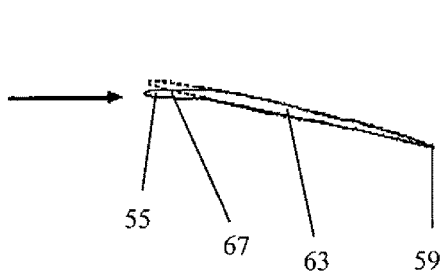
FIG. 4b shows the angle of attack of the FIG. 4a fluidfoil.

Turning now to FIGS. 4a and 4b, a fluidfoil 63 is provided that is similar to fluidfoil 53. Like reference numerals for like features are used. The difference between the two fluidfoils 53 and 63 is the additional provision in fluidfoil 63 of a leading edge zone 65 having a deflected region 67 which locally reduces the angle of attack of the fluidfoil 63. Consequently fluid that is incident on the deflected region 67 has a higher momentum and therefore tends to separate closer to the leading edge 55. Furthermore the higher momentum fluid tends to entrain surrounding fluid and increase its momentum even in fluid incident on other parts of the leading edge 55 and leading edge zone 65. The deflected regions 67 therefore reduce the size of the vortices/wakes 61 produced by the fluidfoil 63, consequently reducing the noise it produces. Further the deflected region acts like an aerodynamic fence, partially blocking spanwise flow of fluid and therefore reducing fluidfoil tip vortices 69 (which are inefficient and may add to noise production especially where ingested by a downstream rotor).

It will be understood that the invention is not limited to the embodiments above-described and various modifications and improvements can be made without departing from the various concepts described herein. Any of the features may be employed separately or in combination with any other features and the invention extends to and includes all combinations and sub-combinations of one or more features described herein in any form of fluidfoil or gas turbine engine.

The invention claimed is:

1. A fluidfoil comprising:
   a leading edge; and
   a leading edge zone behind the leading edge and extending spanwise over a full span of the fluidfoil,
   wherein:
   the leading edge zone comprises one or more deflected regions, which locally reduce an angle of attack of the fluidfoil, each of the one or more deflected regions being an upwardly-oriented ramp for fluid passing the leading edge on a suction surface of the fluidfoil, and
   each of the one or more deflected regions comprises a depression in the leading edge zone and tapers in a chordwise direction to a point from a maximum spanwise width at the leading edge, through the leading edge zone, to no spanwise width at an interface of the leading edge zone with a main body of the fluidfoil.

2. The fluidfoil according to claim 1, wherein each of the one or more deflected regions comprises a local modification to a surface contouring of the leading edge zone.

3. The fluidfoil according to claim 1, wherein there is no local chordwise extension of the leading edge associated with any of the one or more deflected regions.

4. The fluidfoil according to claim 1, wherein there is no local chordwise retraction of the leading edge associated with any of the one or more deflected regions.

5. The fluidfoil according to claim 1, wherein an extent of deflection of each of the one or more deflected regions decreases from the leading edge through the leading edge zone.

6. The fluidfoil according to claim 1, wherein each of the one or more deflected regions blends into the main body of the fluidfoil extending behind the leading edge zone and disappears.

7. The fluidfoil according to claim 6, wherein a depth of each of the one or more deflected regions tapers in the chordwise direction from a maximum at the leading edge so as to blend with the main body of the fluidfoil.

8. The fluidfoil according to claim 1, wherein at least one of the one or more deflected regions is provided nearer to a tip than a root of the fluidfoil.

9. The fluidfoil according to claim 1, wherein the depression at each of the one or more deflected regions is present at the leading edge.

10. A gas turbine engine comprising:
    a contra-rotating pair of rotors, wherein at least one open rotor blade of a front-most of the rotors is a fluidfoil that comprises:
    a leading edge; and
    a leading edge zone behind the leading edge and extending spanwise over a full span of the fluidfoil,
    wherein:
    the leading edge zone comprises one or more deflected regions which locally reduce an angle of attack of the fluidfoil, and
    each of the one or more deflected regions tapering in a chordwise direction to a point from a maximum spanwise width at the leading edge, through the leading edge zone, to no spanwise width at an interface of the leading edge zone with a main body of the fluidfoil.

11. A gas turbine engine with one or more fluidfoils that each comprise:
- a leading edge; and
- a leading edge zone behind the leading edge and extending spanwise over a full span of the fluidfoil, wherein:
the leading edge zone comprises one or more deflected regions, which locally reduce an angle of attack of the fluidfoil, each of the one or more deflected regions being an upwardly-oriented ramp for fluid passing the leading edge on a suction surface of the fluidfoil, and each of the one or more deflected regions comprises a depression in the leading edge zone and tapers in a chordwise direction to a point from a maximum spanwise width at the leading edge, through the leading edge zone, to no spanwise width at an interface of the leading edge zone with a main body of the fluidfoil.

12. A fluidfoil comprising:
- a leading edge; and
- a leading edge zone behind the leading edge and extending spanwise over a full span of the fluidfoil, wherein:
the leading edge zone comprises one or more deflected regions, which locally reduce an angle of attack of the fluidfoil, each of the one or more deflected regions being an upwardly-oriented ramp for fluid passing the leading edge on a suction surface of the fluidfoil, each of the one or more deflected regions tapers in a chordwise direction to a point from a maximum spanwise width at the leading edge, through the leading edge zone, to no spanwise width at an interface of the leading edge zone with a main body of the fluidfoil, the leading edge at each of the one or more deflected regions is displaced toward a pressure surface of the fluidfoil relative to the leading edge at non-deflected regions of the leading edge zone. and the fluidfoil comprises at least one open rotor blade.

13. The fluidfoil according to claim 12, wherein each of the one or more deflected regions comprises a portion of the leading edge zone angled further towards the pressure surface of the fluidfoil than non-deflected regions of the leading edge zone which extend spanwise to either side and/or between each deflected region.

14. The fluidfoil according to claim 13, wherein the fluidfoil has a consistent angle of attack in the non-deflected regions.

15. The fluidfoil according to claim 13, wherein a depth of each of the one or more deflected regions tapers in one or both spanwise directions so as to blend with the respective non-deflected region of the leading edge zone.

* * * * *